(12) United States Patent
Gibson et al.

(10) Patent No.: US 9,512,862 B2
(45) Date of Patent: Dec. 6, 2016

(54) FASTENER

(71) Applicants: Charles Gibson, Casco, MI (US); Stephen Angst, Chesterfield, MI (US)

(72) Inventors: Charles Gibson, Casco, MI (US); Stephen Angst, Chesterfield, MI (US)

(73) Assignee: Davalor Mold Corporation, Chesterfield, MI (US)

( * ) Notice: Subject to any disclaimer, the term of this patent is extended or adjusted under 35 U.S.C. 154(b) by 109 days.

(21) Appl. No.: 14/523,121

(22) Filed: Oct. 24, 2014

(65) Prior Publication Data

US 2016/0115977 A1 Apr. 28, 2016

(51) Int. Cl.
*F16B 2/06* (2006.01)
*F16B 5/00* (2006.01)

(52) U.S. Cl.
CPC ............ *F16B 5/0016* (2013.01); *Y10T 24/148* (2015.01); *Y10T 24/1469* (2015.01); *Y10T 403/7094* (2015.01)

(58) Field of Classification Search
CPC ........... Y10T 24/148; Y10T 403/7094; Y10T 24/1496; Y10T 403/5773; Y10T 24/44752; F16B 2/06
USPC ........................................................ 403/381
See application file for complete search history.

(56) References Cited

U.S. PATENT DOCUMENTS

| | | | | |
|---|---|---|---|---|
| 3,854,482 A * | 12/1974 | Laugherty | ............ | A61B 17/122 24/543 |
| 4,212,303 A * | 7/1980 | Nolan | .................. | A61B 17/122 24/543 |
| 5,185,908 A * | 2/1993 | Oetiker | .................. | B23K 26/22 24/20 CW |
| 5,768,752 A * | 6/1998 | Oetiker | .................. | F16L 33/02 24/20 CW |
| 6,421,886 B1 * | 7/2002 | Oetiker | .................. | F16L 33/02 24/20 EE |
| 8,123,060 B2 * | 2/2012 | Obergoenner | ........... | B65D 9/04 217/65 |

* cited by examiner

*Primary Examiner* — Robert J Sandy
*Assistant Examiner* — Michael Lee
(74) *Attorney, Agent, or Firm* — Harness, Dickey & Pierce, P.L.C.

(57) ABSTRACT

A fastener for coupling together parts with a curved surface has a male member and a female member. The male element has an overall I-shape with a head portion, neck portion and a body portion. The body portion is adapted to be coupled with one of the curved part. The head portion includes an ear on each side. A first surface on the male member is arcuate along the body, neck and head portions. The female member includes a pocket with a pair of deflectable projections. The projections extend from opposing walls toward one another. The projections engage the male member along the neck portion between the head portion and body portion to retain the male member with the female member.

12 Claims, 3 Drawing Sheets

FASTENER

FIELD

The present disclosure relates to fasteners and, more particularly, to a fastener to couple parts with curved surface together.

BACKGROUND

Various types of fasteners exist for coupling parts together. When curved surface parts are to be coupled together, ordinarily a hook and latch type fastener is utilized to couple the parts together. While this type of fastening device is adequate for securing the parts together, the fastening device is subject to failure due to the frangibility of the fastener. Additionally, different types of welding or the like may be utilized to hold the curved surface parts together. However, if friction type welding is utilized, string debris or the like, in the case of friction welding of plastics parts, may occur on the part. This string or debris, when the part is utilized for its intended purpose in a closed system, may eventually cause a failure or disruption of service. Thus, it would be desirable to have a fastening device that overcame the deficiencies of the known art.

The present disclosure provides the art with a fastening device that utilizes a snap feature. The present disclosure provides a fastener for parts with curved surfaces that provide a male and female member that snap together. The present disclosure provides a fastening device that eliminates the need for friction welding.

SUMMARY

According to the present disclosure, a fastener for coupling together parts with curved surfaces comprises a male member adapted to be coupled with a first curved surface part. A female member is adapted to be coupled with a second curved surface part. The male element has an overall I shape with a head portion, neck portion and body portion. The body portion is adapted to be unitarily formed with the curved surface part. The head portion includes an ear on each side. A first surface on the male member is arcuate and extends along the body, neck and head portions. The male member first surface is adapted to be continuous with the curved surface of the curved surface part. The female member includes a pocket with a pair of deflectable projections. The projections extend from opposing sidewalls towards one another. The projections engage the male member along the neck portion between the head portion and body portion to retain the male member with the female member. The male member has a second surface opposing the first surface. The male member has a wedge shape in side elevation. The pocket has a planar wall between the sidewalls to abut the second surface of the male member. The head portion is deflectable to couple with the projects.

According to a second object of the disclosure, a pair of parts with curved surfaces includes a pair of fasteners. A first and second part with curved surfaces have an overall half cylindrical configuration. The pair of fasteners each includes a male member coupled with the first and/or second part. A female member is coupled with the first and/or second part. The male element has an overall I shape with a head portion, neck portion and body portion. The body portion is coupled with the curved surface part. The head portion includes an ear on each side. A first surface on the male member is arcuate and extends along the head, body and neck portions. The first surface is continuous with the curved surface of the curved surface part. The female member includes a pocket formed in the first and/or second part. A pair of deflectable projections extends from opposing sidewalls towards one another in the pocket. The projections engage the male member along the neck portion between the head portion and the body portion to retain the male member within the female member. The male member has a second surface opposing the first surface. The male member has a wedge shape in side elevation. The pocket has a planar wall between the sidewalls to abut the second surface of the male member. The head portion is deflectable to couple with the projections.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
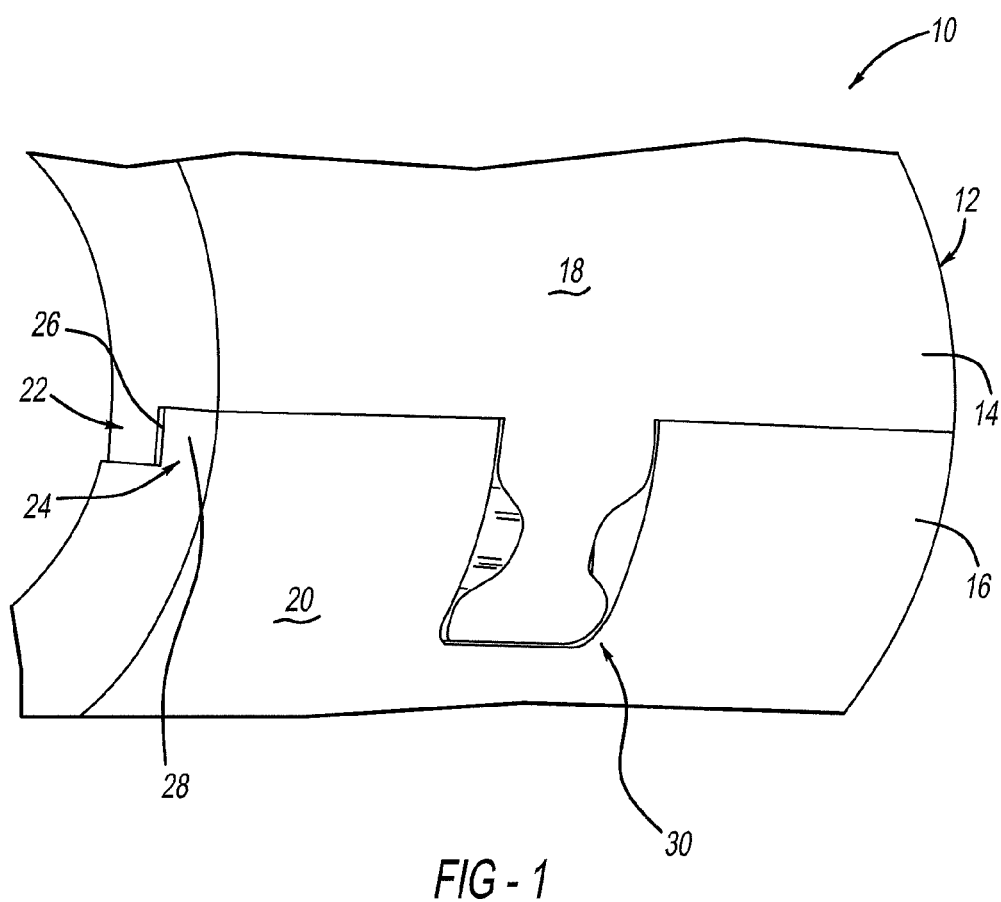
FIG. 1 is an exploded perspective view of curved surface parts with a fastener.
Figure 2:
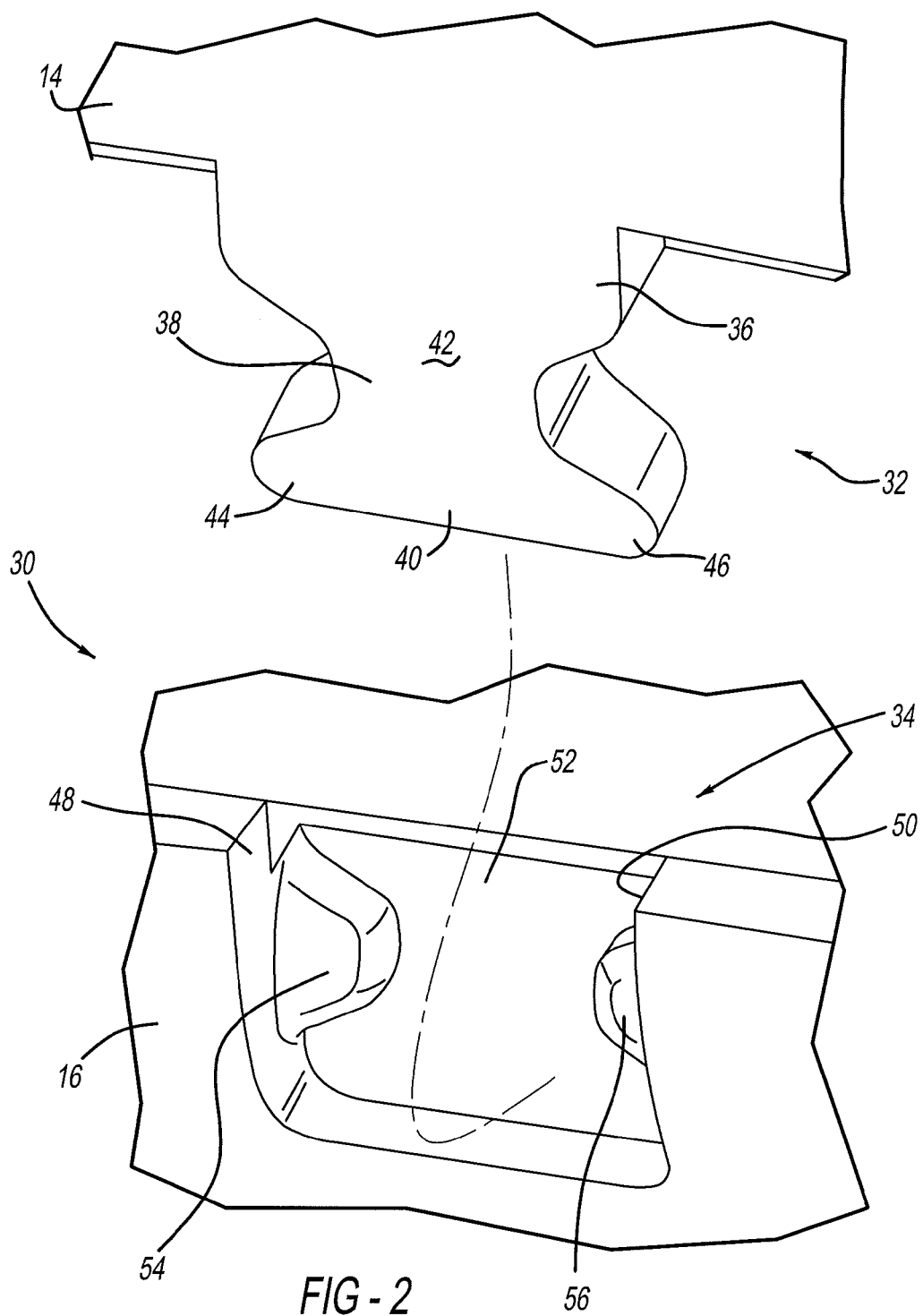
FIG. 2 is an exploded perspective view of FIG. 1.

Example embodiments will now be described more fully with reference to the accompanying drawings.

Turning to the figures, a pair of parts with a curved surface fastened by friction fasteners is illustrated and designated with the reference numeral 10. The cylinder 12 includes a first part 14 and a second part 16. Both the parts 14, 16 have an overall half cylindrical shape with outer curved surface 18, 20. The edges of the parts 14, 16 have step portions 22, 24. The step portions 22, 24 complement one another such that one of the steps 26 mates on one side of the other step 28. The steps 26, 28 extend the length of the parts 14, 16.

Figure 3:
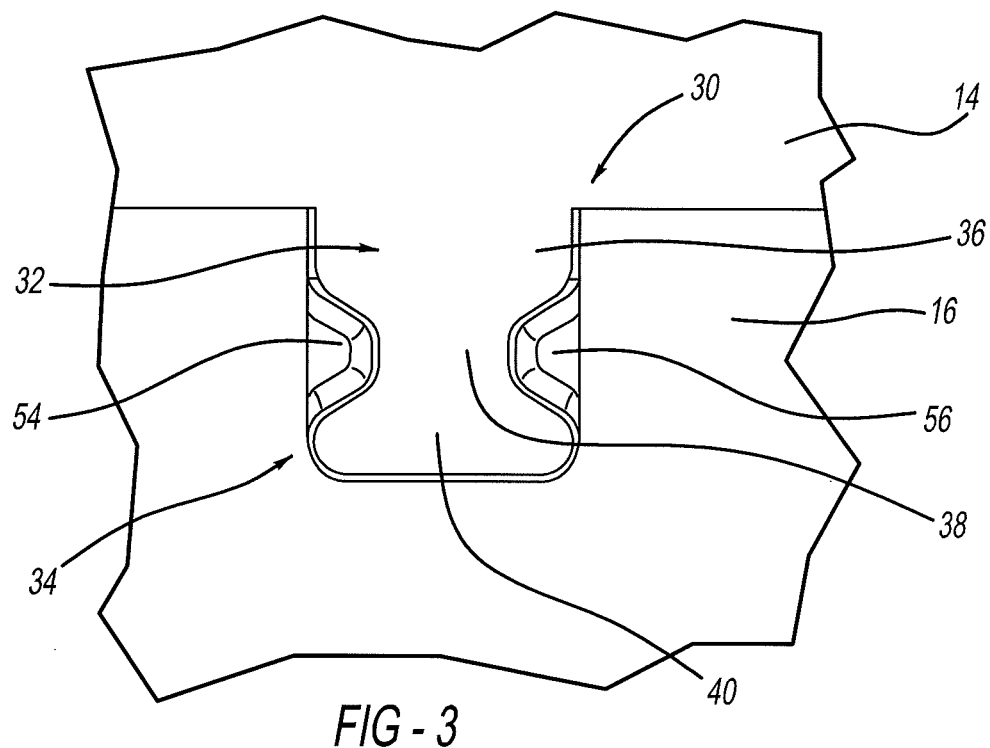
FIG. 3 is a plan view of FIG. 1.

A fastener 30 is illustrated coupling the parts 14, 16 together. The fastener 30 includes a male member 32 and a female member 34. The parts 14, 16 may include two male members, one male member, one female member, or two female members so that the male and female members oppose one another. This enables the fastener to snap together as illustrated in FIGS. 1 and 3.

The male member 32 has an over I shape with a body portion 36, a neck portion 38 and a head portion 40. The body portion 36 is integrally or unitarily formed with part 14. The male member 32 includes a first surface 42 that is arcuate and continuous with the outer surface 18 of the part 14. Thus, the first surface 42 has a curvature substantially similar to that of the curvature of the surface 18. The curvature of the surface 42 extends from the body portion through the head portion 40. The head portion 40 includes a pair of ears 44, 46. This provides the head portion 40 and neck portion 38 with an overall mushroom shape. The ears 44, 46 are deflectable.

The female member 34 has an overall pocket shape. The pocket includes sidewalls 48, 50 as well as a wall 52 spanning between the sidewalls 48, 50. A pair of projections 54, 56 extends from the sidewalls 48, 50, respectively. The projections 54, 56 oppose one another and snap together with the male member 32. The projections 54, 56 are deflectable so that the deflectable ears 44, 46, entering into the female member 34, pass by the projections 54, 56. Thus, the projections 54, 56 rest against the neck 38 of the male member 32. The head portion 46 and body portion 36 are along the sides of the projection 54, 56 to provide a further snap force as illustrated in FIG. 3. The female member 34 is illustrated in the other half cylindrical part 16.

Figure 4:
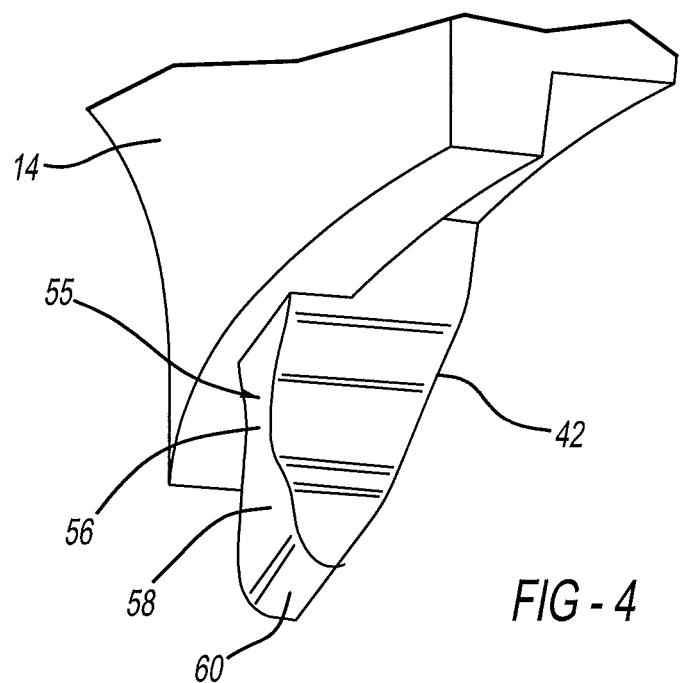
FIG. 4 is a perspective elevation view of the male member.

A second surface 55 opposes the curved surface 42 of the male member 32. The surface portion 56 is substantially planar. An additional surface portion 58 angles from the surface portion 56 towards the tip 60 of the male member 32. Thus, the male member 32 has an overall wedge shape in side elevation as illustrated in FIG. 4.

Once the male member 32 and female member 34 are in position as illustrated in FIG. 3, it is difficult to remove the male member 32 from the female member 34. This enables the cylindrical part 10 to be shipped and moved without the worry of the two half cylindrical parts 14, 16 being disengaged from one another.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fastener for coupling together curved surfaces parts comprising:
   a male member adapted to be coupled with a first curved surface part;
   a female member adapted to be coupled with a second curved surface part;
   the male element having an overall I-shape with a head portion, neck portion and a body portion, the body portion adapted to be coupled with the first curved surface part, the head portion include a pair of opposing ears, a first surface on the male member is arcuate and continuous along the body, neck and head portions,
   the female member including a pocket defining opposing sidewalls and a wall spanning between the sidewalls, a pair of deflectable projections extending into the pocket, the projections extend from the opposing sidewalls toward one another, the projections engage the male member along the neck portion between the head portion and body portion to retain the male member with the female member.

2. The fastener of claim 1, wherein the male member has a second surface opposing the first surface so that the male member has a wedge shape in side elevation.

3. The fastener of claim 2, wherein the pocket has a planar wall between the opposing walls to abut the second surface of the male member.

4. The fastener of claim 1, wherein the head is deflectable to couple with the projections.

5. A pair of curved parts with a pair of fasteners comprising:
   a first curved part having an overall half cylinder configuration;
   a second curved part having an overall half cylindrical configuration;
   a pair of fasteners, each fastener including:
   a male member coupled with the first curved part;
   a female member coupled with the second curved part;
   the male element having an overall I-shape with a head portion, neck portion and a body portion, the body portion formed with the first curved part, the head portion including an ear on each side, a first surface on the male member is arcuate, along the body, neck and head portions, and is continuous with a curved surface of the first curved part;
   the female member including a pocket with a pair of deflectable projections, the projections extend from opposing walls toward one another, the projections engage the male member along the neck portion between the head portion and body portion to retain the male member with the female member.

6. The fastener of claim 5, wherein the male member has a second surface opposing the first surface so that the male member has a wedge shape in side elevation.

7. The fastener of claim 6, wherein the pocket has a planar wall between the opposing walls to abut the second surface of the male member.

8. The fastener of claim 5, wherein the head is deflectable to couple with the projections.

9. The fastener of claim 5, wherein the first and second curved parts have a stepped portion extending a length of the first and second parts, the stepped portions mating with one another.

10. A fastener for coupling together with curved surfaces parts comprising:
    a male member adapted to be coupled with a first curved surface part;
    a female member adapted to be coupled with a second curved surface part;
    the male element having an overall I-shape with a head portion, neck portion and a body portion, the body portion adapted to be coupled with the first curved surface part, the head portion include a pair of opposing ears, a first surface on the male member is arcuate and continuous along the body, neck and head portions;
    a second surface opposing the first surface so that the male member has a wedge shape in side elevation; and
    the female member including a pocket, a pair of deflectable projections, the projections extend from opposing walls toward one another, the projections engage the male member along the neck portion between the head portion and body portion to retain the male member with the female member.

11. A pair of curved parts with a pair of fasteners comprising:
    a first curved part having an overall half cylinder configuration;
    a second curved part having an overall half cylindrical configuration;
    a pair of fasteners, each fastener including:
    a male member coupled with the first curved part;
    a female member coupled with the second curved part;
    the male element having an overall I-shape with a head portion, neck portion and a body portion, the body portion formed with the first curved part, the head portion including an ear on each side, a first surface on the male member is arcuate, along the body, neck and head portions, and is continuous with a curved surface of the first curved part;

a second surface opposing the first surface so that the male member has a wedge shape in side elevation; and the female member including a pocket with a pair of deflectable projections, the projections extend from opposing walls toward one another, the projections engage the male member along the neck portion between the head portion and body portion to retain the male member with the female member.

12. A pair of curved parts with a pair of fasteners comprising:

a first curved part having an overall half cylinder configuration;

a second curved part having an overall half cylindrical configuration;

a pair of fasteners, each fastener including:

a male member coupled with the first curved part;

a female member coupled with the second curved part;

the male element having an overall I-shape with a head portion, neck portion and a body portion, the body portion formed with the first curved part, the head portion including an ear on each side, a first surface on the male member is arcuate, along the body, neck and head portions, and is continuous with a curved surface of the first curved part;

the female member including a pocket with a pair of deflectable projections, the projections extend from opposing walls toward one another, the projections engage the male member along the neck portion between the head portion and body portion to retain the male member with the female member; and the first and second curved parts have a stepped portion extending a length of the first and second parts, the stepped portions mating with one another.

* * * * *